United States Patent [19]

Annin et al.

[11] Patent Number: 4,953,609

[45] Date of Patent: Sep. 4, 1990

[54] PORTABLE SCREEN

[76] Inventors: David R. Annin, 4542 SE. 104th Ave., Portland, Oreg. 97266; Rusty L. Kelley, 8324 NE. Sumner, Portland, Oreg. 97220

[21] Appl. No.: 405,653

[22] Filed: Sep. 11, 1989

[51] Int. Cl.⁵ .............................................. A47H 7/00
[52] U.S. Cl. ........................................ 160/24; 160/239; 160/351
[58] Field of Search .................. 160/351, 67, 239, 24, 160/29, 23.1, 72, 73, 66, 22, 350

[56] References Cited

U.S. PATENT DOCUMENTS

| | | | |
|---|---|---|---|
| 1,627,906 | 5/1927 | Jones | 160/239 X |
| 1,800,627 | 4/1931 | Heck | 160/24 |
| 1,820,739 | 8/1931 | Heck | 160/24 X |
| 1,915,944 | 6/1933 | Nagel | 160/24 |
| 1,981,444 | 11/1934 | Wittel | 160/24 |
| 2,055,862 | 9/1936 | Friedman | 160/24 |
| 2,395,303 | 2/1946 | Stableford | 160/24 |
| 2,479,812 | 8/1949 | Cechmanek | 160/24 |
| 3,144,899 | 8/1964 | Stewart et al. | 160/351 X |
| 4,188,964 | 2/1980 | Greer | 160/67 X |

Primary Examiner—David M. Purol
Attorney, Agent, or Firm—James D. Givnan, Jr.

[57] ABSTRACT

A combination screen and carrying case having a pair of tubular legs each of rectangular section and held in an operative upright position by a friction lock. End segments of a case partition are each movable in response to a threaded pivot pin urging the end segments into leg engagement. A screen cross member is provided with grooved fittings at its ends for slipped, locking engagement with slots in the upper end of each leg.

7 Claims, 1 Drawing Sheet

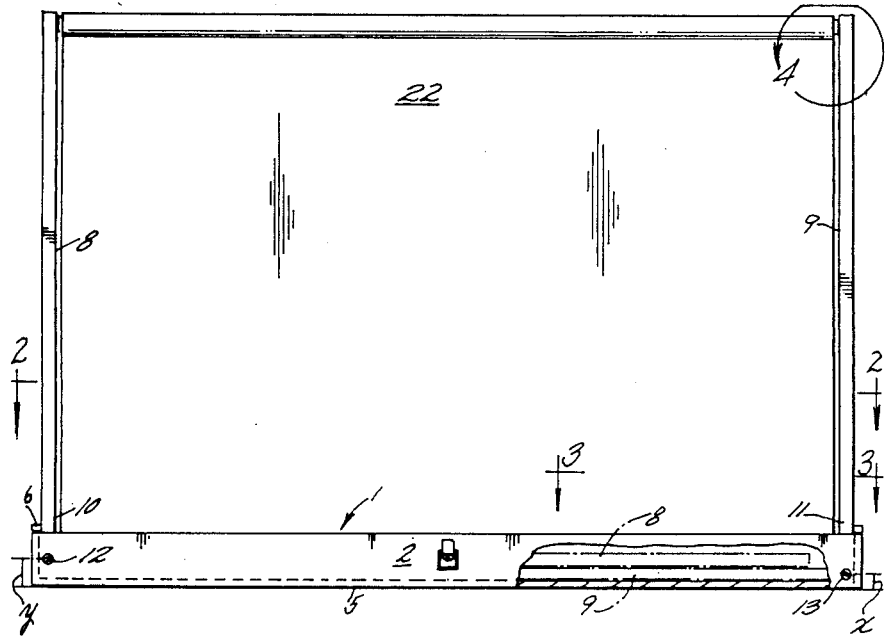

PORTABLE SCREEN

BACKGROUND OF THE INVENTION

The present invention pertains generally to a screen and support structure therefore all being integral with a carrying case.

In the prior art are a number of patent disclosures wherein a roller mounted screen and leg support therefore are integral with a portable, box-like structure or carrying case. Examples of such screens are found in U.S. Pat. Nos. 1,616,928; 1,627,906; 2,395,303; and 2,579,850. The portable screens disclosed are somewhat complex in nature which is disadvantageous both from the standpoint of cost of manufacture as well as screen set up. Typically screens are roller mounted with the roller being rewound by spring power requiring that the screen be temporarily manually supported with one hand while the support structure is positioned in place by the remaining hand of the screen user. Further, the known portable screens require a degree of mechanical aptitude not likely to be found in all screen users. Above noted U.S. Pat. No. 2,395,303 is of further interest in that it discloses a pair of pivotally joined screen supporting legs which are mounted by pivot pins to a wall of the box-like enclosure. Spring members are relied upon to retain the screen supporting legs operatively disposed in an upright position.

A further drawback to known portable screens, whether they be for image display or room dividing purposes, is the weight of the screen assembly wherein brace or lock components are relied upon to maintain a screen deployed in operative configuration.

SUMMARY OF THE PRESENT INVENTION

The present invention is embodied within a screen and enclosure therefore with leg members held in place by adjustable locking means.

The present screen includes an elongate, walled structure within which a rolled screen is carried. Additionally mounted in the enclosure is a pair of tubular legs confined between a front wall of the enclosure and locking means for maintaining screen supporting legs in perpendicular relationship to the enclosure. The legs are pivotally secured at their lower ends to the enclosure by threaded means which additionally serve to draw an internal member of the enclosure into frictional engagement with a segment of the leg. Accordingly, a pair of screen supporting legs may be vertically positioned without the use of springs, braces or tediously inserted locks all of which require considerable effort on the users part. A tube at the leading or outer end of the screen is inter-engageable at its ends with the upper ends of the tubular legs. Slotted end segments of the tubular legs each receive a button-head type fitting in the screen mounted tube for locked engagement therewith. Setting up of the present screen is greatly facilitated by the leg members being held vertical by friction means to permit the screen user to use both hands for screen deployment.

Important objectives of the present screen include the provision of a screen which lends itself to being set up without the aid of tools nor with a certain level of mechanical aptitude; the provision of a screen having very few components resulting in a low manufacturing cost, ease of use and of light weight; the provision of a screen which is readily adaptable for use in the display of photographic images or in a medical care room as a divider between patients.

BRIEF DESCRIPTION OF THE DRAWINGS

In the accompanying drawings:

FIG. 1 is a front elevational view of the present screen deployed for use;

FIG. 2 is a horizontal sectional view taken along line 2—2 of FIG. 1;

FIG. 3 is a fragmentary horizontal sectional view taken along line 3—3 of FIG. 1; and FIG. 4 is an enlarged detailed view of that structure encircled at 4 in FIG. 1.

DETAILED DESCRIPTION OF PREFERRED EMBODIMENTS

With continuing attention to the drawings wherein applied reference numerals indicate parts similarly hereinafter identified, the reference numeral 1 indicates generally a box-like case or enclosure having a front wall 2, a rear wall 3, end walls 4 and a bottom wall 5. A lid 6 is hingedly mounted to rear wall 3 and includes suitable latch components for securing same to front wall 2. A handle is at 7.

Pivotally mounted within the enclosure adjacent its ends are tubular leg members at 8 and 9 each of rectangular section. A lower end segment 10 and 11 of each leg member is apertured to receive a headed pivot pin at 12 and 13 which extends through front wall 2.

Interiorly of the enclosure are locking means shown as end portions 20A-20B of a partition 20. Each end portion receives the inner end of pivot pins 12 and 13. Said locking means has upright planar surfaces which are urged toward leg member engagement upon adjustment of the pivot pins. The pivot pins each engage a threaded nut element as at 18 shown as tee nuts embedded into the end portions of partition 20. Accordingly, surface to surface engagement of the vertical end portion surfaces as at 20C of the locking means against a flat surface of each leg member provides a friction lock to maintain a free standing leg member in the position set during screen set up. Once in place the leg member will remain so positioned until intentionally collapsed into the enclosure. End portions at 20A-20B of the partition are unsecured and are fee to move laterally in response to rotation of pivot pins 12-13 urging the end portions toward the leg member end segments while the central part of partition 20 is secured to bottom wall 5 by fasteners at 21. The fasteners are offset several inches from the ends of the partition to permit flexing of the partition end portions.

A screen at 22 is mounted on a spring powered roller 23 carried by brackets 24 attached to the enclosure. The outermost end of the screen is hemmed to provide a crosswise extending tunnel within which a rigid tubular cross member 25 is received. In each end of said cross member is a fitting 26 having an annular groove 27. The distal end of each leg member is slotted at 28 with the slot being of a width to accept the grooved portion 27 of the end fitting. Accordingly, the screen being carried by a spring powered roller acts to retain the fittings in seated engagement with the slotted ends of the leg members. Further, as the opposed inner and outer leg surfaces closely abut the walls of the fitting grooves the leg members and the cross member 25 constitute a rigid screen support structure.

The pivot pins may be periodically adjusted to increase the friction on the leg members to assure the desired degree of locking action thereon to prevent accidental collapsing of same during screen set up. For collapsing of the legs into parallel relationship with one another, the pivot pins 12-13 are offset different vertical distances at X and Y from the enclosure bottom wall. The nut elements 18 may be of the tee type inset within the end portions of the partition and having projections thereon to prevent nut rotation.

While we have shown but one embodiment of the invention, it will be apparent to those skilled in the art that the invention may be embodied still otherwise without departing from the spirit and scope of the invention.

Having thus described the invention, what is desired to be secured by a Letters Patent is:

We claim:

1. A portable screen comprising,
an enclosure having front, rear, end and bottom walls,
a roller mounted screen in place on one of said walls and including a rigid cross member at the screen outer end,
a pair of vertically positionable unitary tubular leg members having upper ends when vertically positioned receiving said cross member to support same and the screen when extended,
adjustable pivot means attaching the remaining ends of said leg member to the interior of said enclosure,
a partition having movable end portions frictionally engageable with said remaining ends of said leg members to retain same against undesired pivotal movement, and
said adjustable pivot means in threaded engagement with said end portions to urge same into biased engagement with said leg members to retain the leg members in upright positions.

2. The portable screen claimed in claim 1 wherein said end portions are flexible.

3. The portable screen claimed in claim 2 wherein said pivot means are threaded fasteners in threaded engagement with nut elements one each in said end portions.

4. The portable screen claimed in claim 1 wherein said upper ends of said tubular leg members are slotted, said cross member including end mounted fittings each defining an annular groove of a width substantially equal to the wall thickness of a tubular leg member for snug sliding engagement of the fittings with the slotted upper ends of the leg members.

5. A portable structure comprising,
a carrying case,
a pair of collapsable tubular leg members carried by said case,
pivot pins carried by said case and pivotally attaching said leg members to the case,
a partition in said case having movable end portions engageable one each with each of said leg members to provide a friction lock therefore to maintain the leg members in an upright position,
said pivot pins having threaded segments in engagement with said movable end portions of the partition whereby rotational adjustment of each of said pivot pins will urge one of said partition end portions into leg engagement, and
a screen including a cross member for supported engagement with said leg members when positioned in an upright manner.

6. The portable structure claimed in claim 5 wherein said screen is of the spring powered roller type.

7. The carrying case claimed in claim 5 wherein said cross member includes end fittings each having an annular groove, each of said tubular leg members defining a slot adjacent their upper end for reception of the fitting on each of said leg members.

* * * * *